(No Model.) 3 Sheets—Sheet 1.
H. C. BARKER.
BRICK MACHINE.
No. 498,203. Patented May 23, 1893.
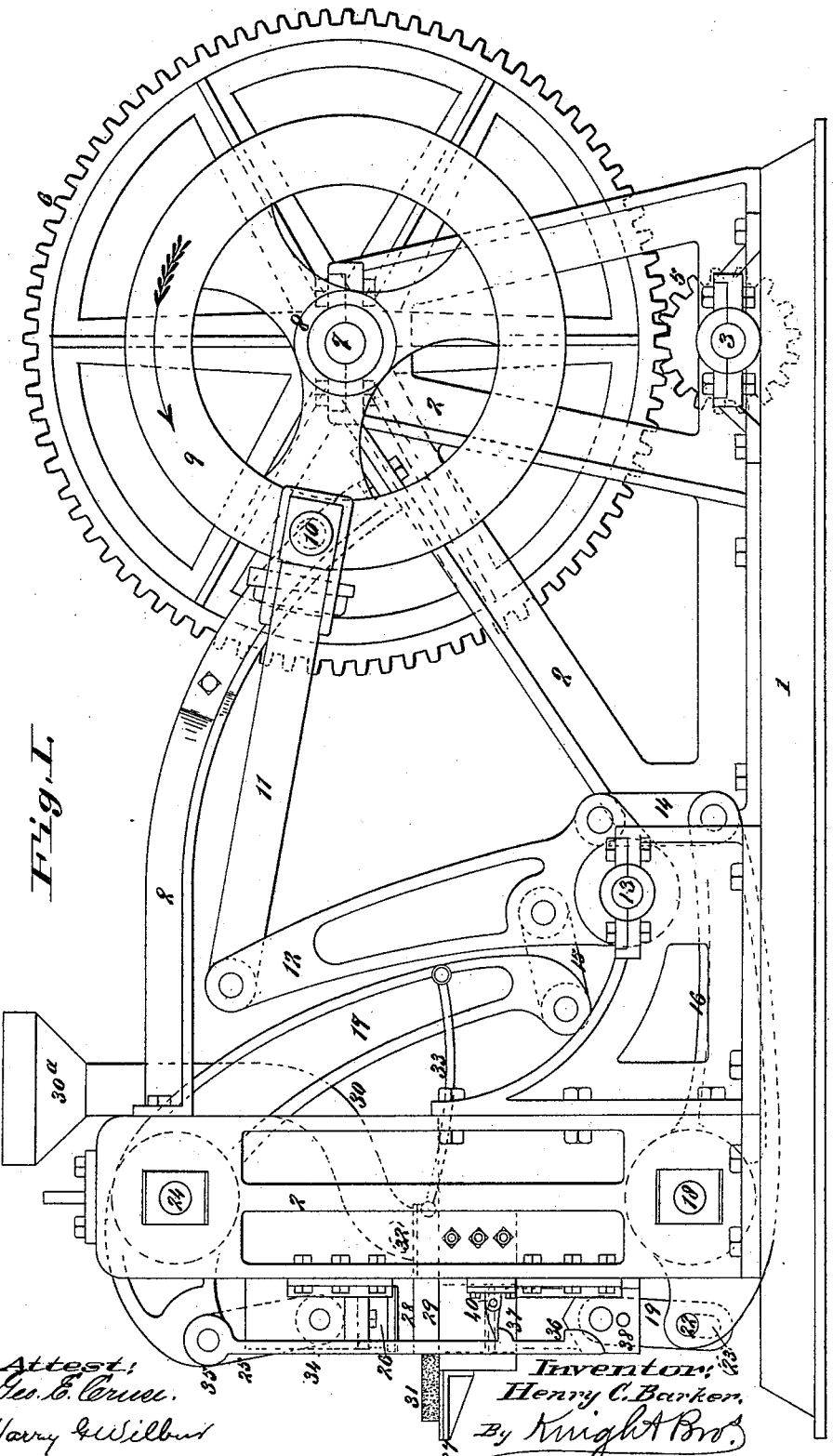
Fig. I.
Attest:
Geo. E. Cruse.
Harry G. Wilbur
Inventor:
Henry C. Barker,
By Knight Bros.
Atty's.

(No Model.) 3 Sheets—Sheet 2.
H. C. BARKER.
BRICK MACHINE.
No. 498,203. Patented May 23, 1893.
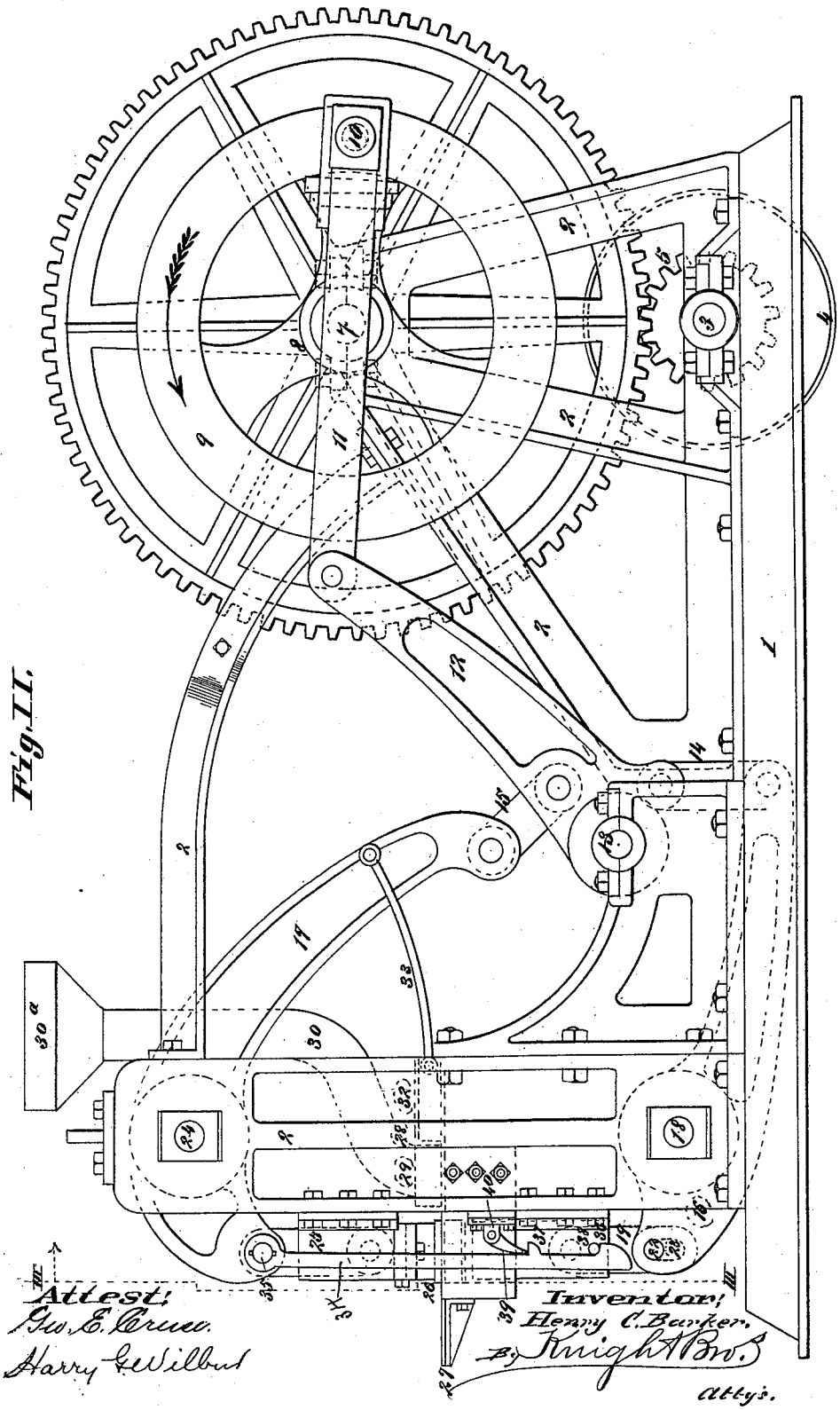
Fig. II.
Attest:
Geo. E. Cruw.
Harry G. Wilbur
Inventor:
Henry C. Barker,
By Knight Bro.
attys.

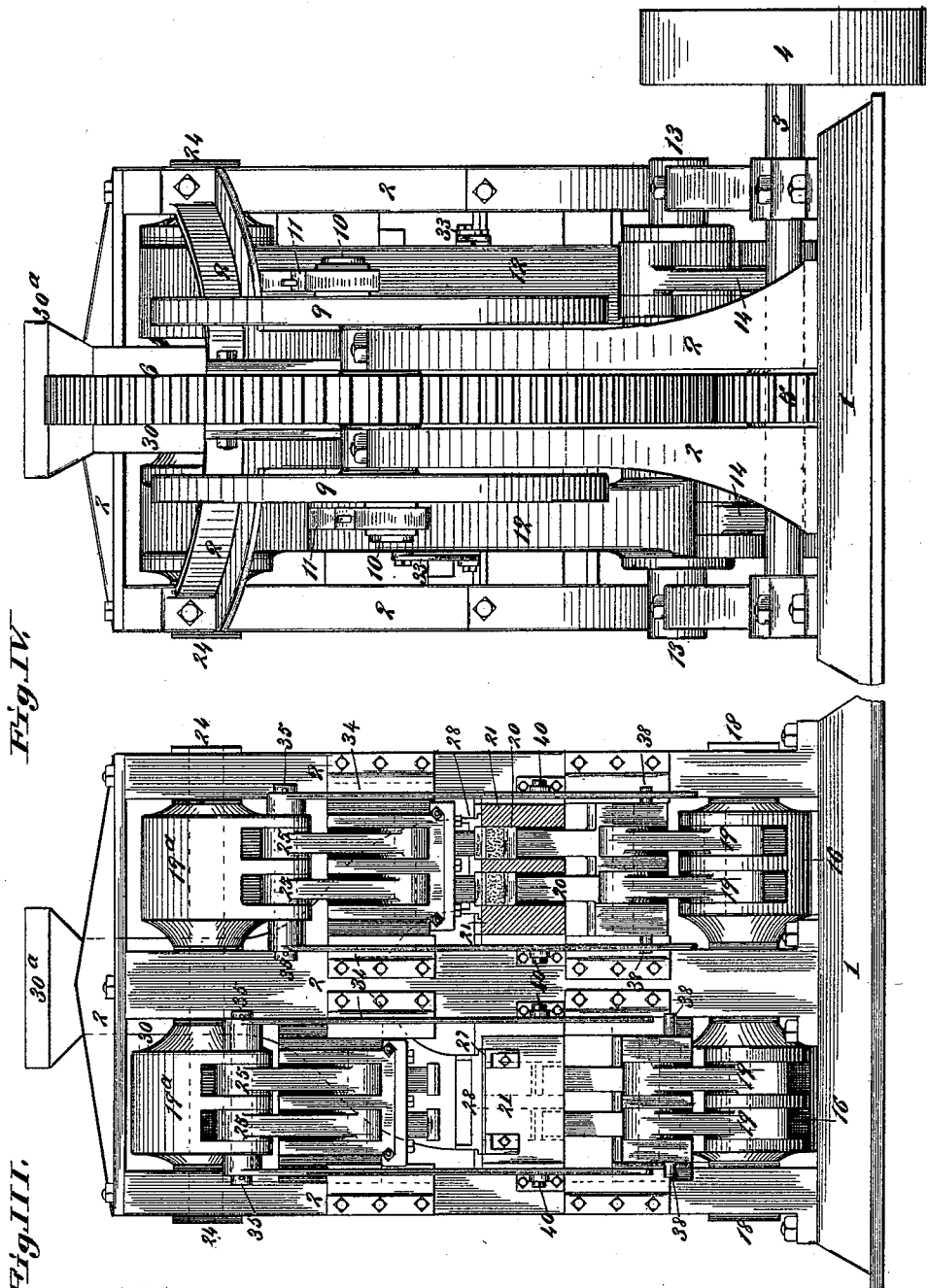

UNITED STATES PATENT OFFICE.

HENRY C. BARKER, OF ST. LOUIS, MISSOURI, ASSIGNOR TO HENRY C. BECKMANN AND JACOB STOCKE, OF SAME PLACE.

BRICK-MACHINE.

SPECIFICATION forming part of Letters Patent No. 498,203, dated May 23, 1893.

Application filed May 2, 1892. Serial No. 431,504. (No model.)

*To all whom it may concern:*

Be it known that I, HENRY C. BARKER, of the city of St. Louis, in the State of Missouri, have invented a certain new and useful Improvement in Brick-Machines, of which the following is a full, clear, and exact description, reference being had to the accompanying drawings, forming part of this specification.

This brick machine belongs to the class in which there is a fixed mold with a movable bottom and a plunger above, between which the brick is pressed, the brick being lifted from the mold by the bottom which rises flush with the top and the brick is pushed forward by the front bar of the charger.

My invention relates to the mechanism for operating the mold bottom and plunger as set forth in the claims.

Figures I and II are side elevations of the machine with the working parts in two positions. Fig. III is a front view part in vertical transverse section at III—III, Fig. II. Fig. IV is a rear elevation.

The machine in the form shown has a central cog-wheel working twin machines one of which is pressing the bricks while the other is discharging the bricks and filling the molds. Each of the twin machines is shown with two molds but the number forms no essential feature of the invention. There may be one or more molds to each machine.

1 is the base and 2 the fixed frame, which may have any suitable construction.

3 is the main shaft and 4 a drive-pulley thereon.

5 is a spur-wheel on the shaft engaging the master wheel 6 that is fast upon a shaft 7 turning in bearings 8.

9 are crank wheels fast upon the shaft 7 outside the bearings 8.

10 are crank pins on the outer sides of the wheels 9.

One of the twin machines will be now described said description applying equally to the other. In fact the machine may be single if desired, and would include all essential features of the invention.

11 is a connecting rod, the rear end of which is boxed to the pin 10, the other end being boxed to the upper end of a toggle-lever 12 having bearing on the frame at 13 and connected by links 14 and 15 to two levers 16 and 17. The lever 16 is fulcrumed to the frame at 18 and is connected by links 19 to the movable bottom or bottoms 20 of the mold or molds 21. The lower pivot bar 22 of the links 19 passes through vertical elongated holes 23 of the links, (see dotted lines in Figs. I and II,) the pivot bar bearing against the upper ends of the holes except when the mold bottom is being lifted to lift the brick from the mold, and at such time the pivot bar is drawn to the top of the holes 23 by a lifting device to be described later. The lever 17 is fulcrumed to the frame 2 at 24 and connected by links 25 to the upper plunger or plungers 26 of the mold or molds.

27 is a table flush with the upper edge of the molds.

28 is the mold charger which is of a well known construction having a bottomless compartment 29 that receives the pulverized clay from the chute 30 of the hopper $30^a$ when the charger is in the rearward position, seen in Fig. II. As the charger moves forward it carries its charge over the mold and the mold is filled. At the same time, the brick 31 having been raised from the mold is pushed forward upon the front end of the table, see Fig. I. The charger has a horizontal extension 32 which closes the mouth of the chute 30 when the charger is in its forward position. As the charger moves backward it carries with it the superfluous clay from the mold. No claim is made as to novelty in the charger *per se*. The charger is moved forward and backward, from the position seen in Fig. II, to that shown in Fig. I, and vice versa, by a rod 33 connecting it with the lever 17. The movement of the charger takes place while the plunger 26 is in a position so far above the mold as to allow its passage, and while the movable bottoms of the molds are in their lower position so as to enable the mold to take in the required quantity of clay to form a brick.

34 are lifting rods pivoted at 35 to the head $17^a$ of the lever 17 upon each side.

36 and 37 are two catches on the inner side of the rods 34. The lower catch 36 of each rod engages a stud 38 upon the base 20ª of each mold or pair or set of molds as the case may be, so that as the head of the lever 17 rises the mold bottoms are drawn up with it, and the bricks or brick lifted from the mold ready to be pushed forward (as aforesaid.) It is obvious that the mold bottom must be allowed to drop before the head 17ª descends and to this end the catches 36 are tripped or disengaged from the studs 38. This tripping is done by pawls 39 pivoted to the frame at 40. The pawls 39 engage the upper catches 37 and as the rods ascend the pawls push the rods outward. The construction is such that on the brick reaching its forward position on the table the catches 36 are tripped from the studs 38 and the mold bottoms fall, allowing the clay to fill the molds. It will be seen that the lever 12 with the link 14 forms a toggle, and the same may be said of the lever 12 and link 15.

I claim as new and of my invention—

1. In a brick machine, the combination with a rod having crank connection with a drive shaft of a lever 12 connected to the rod, levers connected with the movable mold bottom and with the mold plunger respectively, and toggle links connecting the latter levers to the lever 12, substantially as and for the purpose set forth.

2. In a brick machine, the combination of a shaft, a rod having crank connection with said shaft and with a lever 12, the movable mold bottom and mold plunger levers 16 and 17 connected to said mold bottom and plunger respectively, toggle links connecting levers 16 and 17 to the lever 12, and the charger connected to the lever 17 by a rod, substantially as set forth.

3. In a brick machine, the combination of the mold bottom having studs 38, the lifting rods hanging from the plunger lever and having catches 36 and 37 and the pawls 39, all constructed and arranged substantially as set forth.

4. In a brick machine, the combination of the mold bottoms having links with elongated pivot holes 23 for the pivot pins 22 connecting them to the actuating lever 16, the upper plunger lever 17, lifting rods 34 hanging from the head of the lever 17 and having catches 36, 37, the studs 38 upon the mold bottoms and the tripping pawl 39, all substantially as set forth.

5. The combination, in a brick machine, of a shaft, as 7, a rod 11 having crank connection therewith, the levers 12, 16 and 17, the toggle links 14 and 15, the links 19 with elongated holes for the pivot connecting them with the lever 16, the mold bottoms having studs 38, lifting rods having catches 36, 37 and the trip pawl 39, all substantially as, and for the purpose set forth.

6. In a brick machine, the combination with a movable mold bottom or plunger, of a lever, as 16, having connection at one end to the mold bottom or plunger, a lever, as 12, connected by suitable means to the other end of the lever 16, and connection from the lever 12 to the drive shaft.

HENRY C. BARKER.

In presence of—
A. M. EBERSOLE,
BENJN. A. KNIGHT.